Patented June 11, 1929.

1,717,319

UNITED STATES PATENT OFFICE.

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA.

PROCESS OF MANUFACTURING CELLULAR CONCRETE.

No Drawing.   Application filed October 26, 1926.   Serial No. 144,390.

One of the most important problems in perfecting cellular concrete is to devise means of obtaining maximum tensile- and compressive strength of the thin walls which form the cells and constitute the supporting structure of the material.

In similar processes outlined in my sundry pending applications for Letters Patent it has been necessary to include sufficient water or other liquid to permit the free movement of the particles of cement and aggregate and the minute bubbles of froth or lather in order to obtain a homogeneous mixture without breaking the thin bubbles during the mixing process.

It is a well known fact that an excessive amount of water in the concrete mixture of gypsum or Portland or other cement tends to diminish the ultimate strength of the concrete and the accepted practice in the art now includes a careful attention to the use of a minimum amount of water in the mixture in order to obtain a maximum ultimate strength of the resulting concrete.

It is also a well known fact that pressure applied to concrete mixtures when freshly mixed and before the chemical action of setting has taken place, will result in increased strength of the concrete, due to increased area of contact between the pieces of aggregate and the minute particles of cement. Thus when the freshly laid mixture, containing small amounts of cement and water in comparison with the aggregate is compressed by rolling or tamping the surface of the spread out mixture, the result is the crowding of the pieces of aggregate and particles of cement very closely together to produce such increased area of contact. This crowding or sliding of the particles one upon the other will result in a denser concrete with very thin cement walls beween the individual pieces of aggregate. This process gives the strongest concrete provided that proper proportions of cement, aggregate and water are used.

The present invention now relates to a process of manufacturing cellular cement applying the above considerations, together with knowledge gained by extensive experiments in this art. In order to increase the ultimate strength of the material I accordingly subject the mixture, when in a soft or plastic state, to pressure obtained from compressed air or other gas. I have found that by inclosing a freshly mixed batch of cellular concrete in an air tight container and then applying pressure by pumping air into the container and keeping the pressure constant during the first few hours of the setting of the concrete, that a greatly increased ultimate strength is obtained in the product.

I have furthermore found that the air cells are changed in size in proportion to the pressure applied. Thus a pressure of two atmospheres caused a decrease of about one-half in the volume of the cellular material and the squeezing of a considerable quantity of water out of the mass.

On examining the material after setting and removal from the container, it was found that the cell walls had been thickened. During the shrinking of the air cells with a consequent thickening of their walls, due to decrease in the volume of air with which the cells were filled, the particles of cement and fine aggregate must have slid upon one another while under pressure, thus becoming more closely packed and separated by a film of colloidal cement, resulting in greater ultimate strength. The action is comparable with that of cementing together two pieces of wood coated with glue when pressure is applied and the pieces are permitted to slide one upon the other.

In carrying out my process I may use, for example, the following approximate volumular proportions but it is to be understood that I may depart from the specific proportions here given which are given by way of example and not by way of limitation:

One part fine sand;
One part Portland cement;
Sufficient water to make a slurry having the consistency of thin mortar or thin enough to slide off a spoon held vertically.
Eight parts of "foam" or froth prepared as described in my copending application, Serial No. 728,279.

A suitable foam producing compound is:
(A) 100 parts powdered casein (by weight)
   450 parts water, (by weight)
   60 parts calcium hydrate, (by weight)
Soak the casein in the water till thoroughly swelled. The lime is then added while stirring constantly. When thoroughly mixed, the casein-water-lime solution is allowed to stand till liquefied by hydrolysis. It is then ready to be mixed with the other ingredients as described below:—

(B) 20 parts aluminum sulphate (powdered) (by weight)
30 parts water (by weight)

The aluminum sulphate is to be added to the water and the whole heated till the sulphate crystals are dissolved.

Solution (B) is then poured into solution (A) while the same is being agitated vigorously. (B) should be added gradually and not allowed to collect in large clots. Curds will form, but the mix will become homogeneous after stirring for an hour or more. Most of the $SO_3$ will precipitate as calcium sulphate. After the solution has become homogeneous and chemical precipitation has ceased, sufficient additional calcium hydrate should be stirred in to precipitate all remaining soluble sulphates. The mixture is then allowed to stand several hours till the solids have collected at the bottom of the container, and the liquid mixture is then to be decanted. An excess of calcium hydrate should be avoided.

For the purpose of making foam for cellular concrete, the above foam compound shoud be diluted with water in the proportion of one part of compound to forty parts of water. Such a solution is suitable for use in a foam machine and also to be used as tempering water in a "beating process".

These ingredients were mixed until the bubbles became homogeneously distributed, placed in a paper or other kind of mold open at the top, whereupon the whole was inserted in an air-tight autoclave which was then sealed, and means for applying and maintaining pressure therein was then put into operation. This is preferably done by means of an air-pump giving a pressure of about two atmospheres or equal to a thirty inch mercury column. With the pressure raised as described the autoclave was kept sealed and undisturbed for about 12 hours, whereupon the pressure was gradually decreased to atmospheric, in order not to bring undue sudden strain upon the cell walls of the concrete. Lastly, the mold with the concrete was removed from the container.

Upon examining the finished concrete slab, it was found that it had shrunk to about half its original volume; it was much stronger than other concrete of the same specific gravity and of the same age, and which had not been subjected to pressure with consequent displacement of particles and change of volume.

It may still further increase the strength of the material by heating it to about 140° F. during the setting period.

For gypsum cellular concrete I use substantially the same proportions of the ingredients as already described, substituting plaster of Paris for the Portland or other cement and obtain similar results.

Accordingly, when in the claims the ingredient "cement" is prescribed it is intended to cover any kind of cement as well as plaster of Paris or Portland cement. Similarly, the expression "foam" in the claims includes the froth or lather described in my copending application Serial No. 608,349 as well as other foams or froths.

What is claimed as new is:

1. The process of manufacturing cellular concrete which consists in making a slurry including foam, and subjecting the same to gas pressure during at least the preliminary part of the setting period.

2. The process of manufacturing cellular concrete which consists in making a slurry including foam, and subjecting the same to gas pressure maintained constant during at least the preliminary part of the setting period.

3. The process of manufacturing cellular concrete which consists in making a slurry including foam, and subjecting the same to a gas pressure of about two atmospheres during at least the preliminary part of the setting period.

4. The process of manufacturing cellular concrete which consists in making a slurry including foam, and subjecting the same to a gas pressure maintained constant at about two atmospheres during at least the preliminary part of the setting period.

5. The process of manufacturing cellular concrete which consists in making a slurry including foam, subjecting the same to gas pressure during at least the preliminary part of the setting period and gradually releasing said applied pressure.

6. The process of manufacturing cellular concrete which consists in making a slurry including foam, subjecting the same to gas pressure maintained constant during at least the preliminary part of the setting period and gradually releasing said applied pressure.

7. The process of manufacturing cellular concrete which consists in making a slurry including foam, subjecting the same to a gas pressure of about two atmospheres during at least the preliminary part of the setting period and gradually releasing said applied pressure.

8. The process of manufacturing cellular concrete which consists in making a slurry including foam, subjecting the same to a gas pressure maintained constant at about two atmospheres during at least the preliminary part of the setting period and gradually releasing said applied pressure.

9. The process of manufacturing cellular concrete which consists in making a thin mortar including foam, and subjecting the same to gas pressure during at least the preliminary part of the setting period.

10. The process of manufacturing cellular concrete which consists in making a thin mortar including foam, and subjecting the same to gas pressure maintained constant during at least the preliminary part of the setting period.

11. The process of manufacturing cellular concrete which consists in making a thin mortar including foam, and subjecting the same to a gas pressure of about two atmospheres during at least the preliminary part of the setting period.

12. The process of manufacturing cellular concrete which consists in making a thin mortar including foam, and subjecting the same to a gas pressure maintained constant at about two atmospheres during at least the preliminary part of the setting period.

13. The process of manufacturing cellular concrete which consists in making a thin mortar including foam, subjecting the same to gas pressure during at least the preliminary part of the setting period and gradually releasing said applied pressure.

14. The process of manufacturing cellular concrete which consists in making a thin mortar including foam, subjecting the same to gas pressure maintained constant during at least the preliminary part of the setting period and gradually releasing said applied pressure.

15. The process of manufacturing cellular concrete which consists in making a thin mortar including foam, subjecting the same to a gas pressure of about two atmospheres during at least the preliminary part of the setting period and gradually releasing said applied pressure.

16. The process of manufacturing cellular concrete which consists in making a thin mortar including foam, subjecting the same to a gas pressure maintained constant at about two atmospheres during at least the preliminary part of the setting period and gradually releasing said applied pressure.

17. In a process as described in claim 13, maintaining the pressure undisturbed for about twelve hours at a temperature of approximately 140° F.

18. In a process as described in claim 15, maintaining the pressure undisturbed for about twelve hours at a temperature of approximately 140° F.

19. The process of manufacturing concrete which consists in making a cellular slurry, and subjecting the same to gas pressure during at least the preliminary part of the setting period.

20. A process of manufacturing cellular concrete, consisting in first making a slurry of approximately one volumular part of fine sand, one part cement, and sufficient water to give the consistency of thin mortar to the slurry; second adding eight parts of "foam"; third mixing these ingredients in a container until the air bubbles become homogeneously distributed; and fourth subjecting the mixture to a pressure of approximately two atmospheres.

21. In a process as described in claim 1, maintaining the pressure on the mixture undisturbed for about twelve hours and subsequently diminishing the pressure gradually until equal to atmospheric.

22. In a process as described in claim 1, maintaining the pressure on the mixture undisturbed for about twelve hours at a temperature of approximately 140° F. and subsequently diminishing the pressure gradually until equal to atmospheric.

23. In a process of manufacturing cellular concrete, consisting in first making a slurry of approximately one volumular part of fine sand, one part cement and sufficient water to give the consistency of thin mortar to the slurry; second adding eight parts of "foam"; third mixing these ingredients in a container until the air bubbles become homogeneously distributed; and fourth compressing the mixture to approximately half its original volume.

24. In a process of manufacturing cellular concrete, consisting in first making a slurry of approximately one volumular part of fine sand, one part cement and sufficient water to give the consistency of thin mortar to the slurry; second adding eight parts of "foam"; third mixing these ingredients in a container until the air bubbles become homogeneously distributed; and fourth compressing the mixture to approximately half its original volume at a temperature of about 140° F.

25. In a process of manufacturing cellular concrete consisting in first making a slurry of approximately one volumular part of fine sand, one part cement and sufficient water to give the consistency of thin mortar to the slurry; second adding eight parts of "foam"; third mixing these ingredients in a container until the air bubbles become homogeneously distributed; and fourth compressing the mixture to approximately half its original volume at a temperature of about 140° F. and maintaining this pressure and temperature for about twelve hours; and fourth gradually diminishing the pressure to atmospheric.

In witness whereof, I have hereunto set my hand at Los Angeles, California, this 2nd day of September, A. D. nineteen hundred and twenty-six.

JOHN A. RICE.